Figure 1:
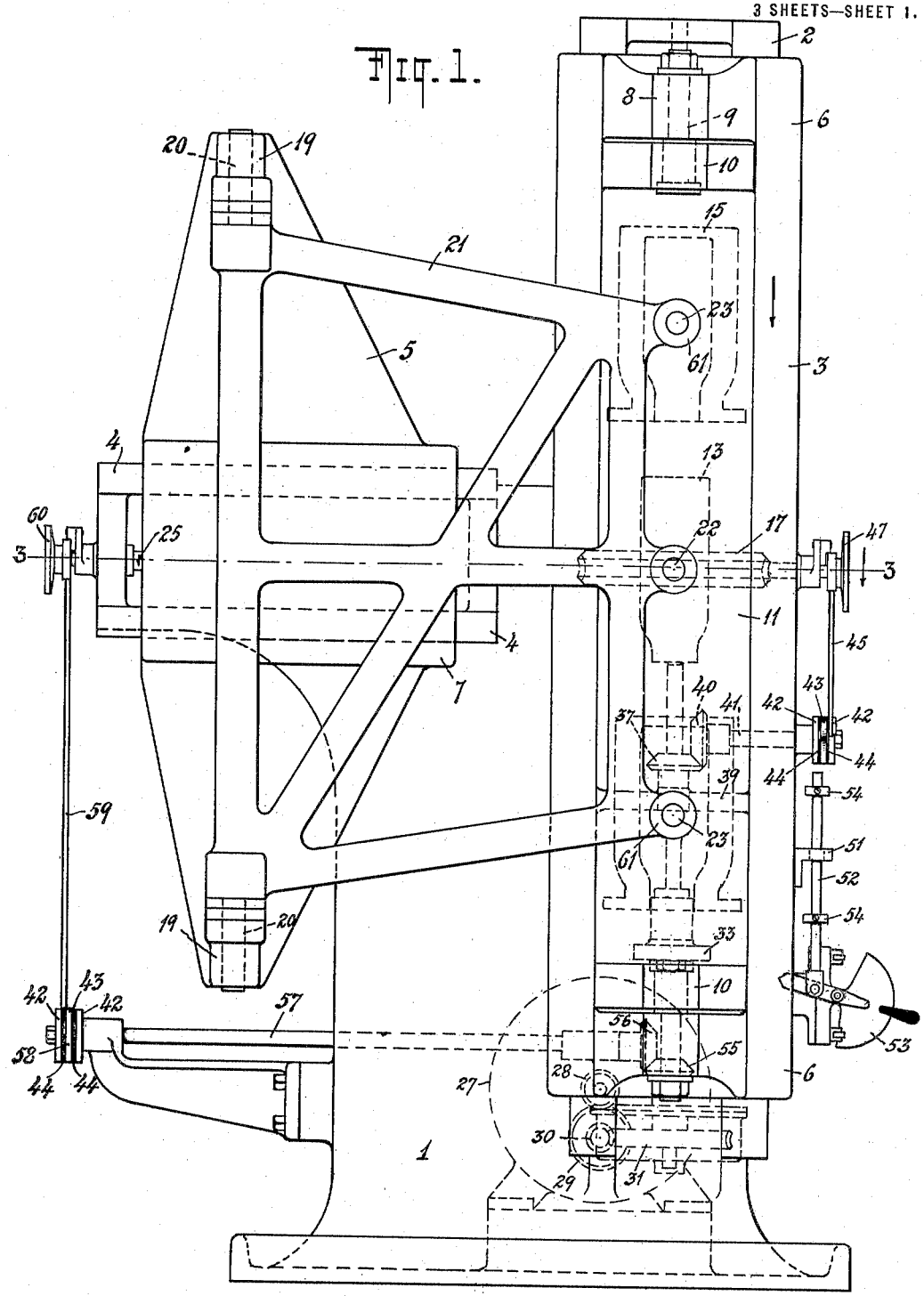

J. F. KELLER.
MACHINE FOR ENGRAVING OR SINKING DIES.
APPLICATION FILED NOV. 10, 1917.

1,325,724.

Patented Dec. 23, 1919.
3 SHEETS—SHEET 2.

WITNESSES

INVENTOR
JOSEPH F. KELLER
BY
ATTORNEYS

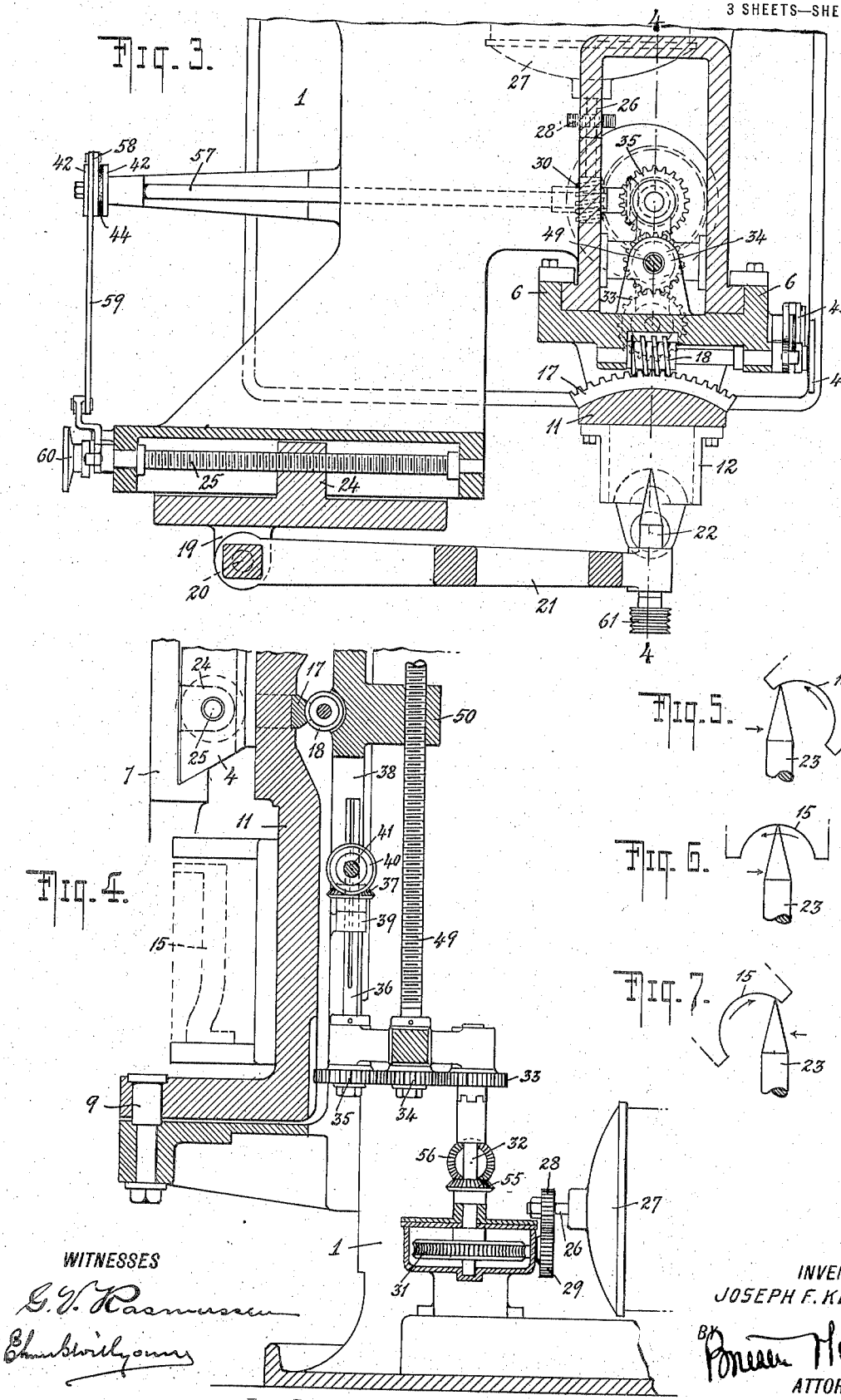

UNITED STATES PATENT OFFICE.

JOSEPH F. KELLER, OF NEW YORK, N. Y., ASSIGNOR TO KELLER MECHANICAL ENGRAVING COMPANY, OF BROOKLYN, NEW YORK, A CORPORATION OF NEW YORK.

MACHINE FOR ENGRAVING OR SINKING DIES.

1,325,724.      Specification of Letters Patent.      Patented Dec. 23, 1919.

Application filed November 10, 1917. Serial No. 201,360.

*To all whom it may concern:*

Be it known that I, JOSEPH F. KELLER, a citizen of the United States, and resident of New York, New York county, State of New York, have invented certain new and useful Improvements in Machines for Engraving or Sinking Dies, of which the following is a specification.

My invention relates to machines for engraving or sinking dies, or for reproducing in relief or intaglio, and more especially to such machines as are to be employed for reproducing a die, from a templet, model or pattern, to the same scale of dimensions, although the invention is not necessarily confined thereto.

More particularly my invention relates to certain improvements which I preferably apply to a machine of the type described and shown in a patent granted to William A. Warman and myself jointly, under date of May 3, 1910, Number 956,769.

In the patented machine referred to the work or die blank to be operated on, as also the pattern, is attached to a support which is vertically movable, either manually or automatically, and is counterbalanced adjustably to correspond with the combined weight of work, pattern and support. The frame carrying the rotating cutter and the tracer has horizontal movement only, also either manual or automatic. When the machine is operating automatically, the plate or work is moved, upwardly say, under the cutter (the pattern being similarly moved under the tracer) to an extent sufficient to bring the cutter to the lower contour line of the work; the movement of the plate and work is then reversed, the cutter and tracer frame being simultaneously fed horizontally across the work by a definite small amount, and the work and pattern is then carried downwardly until the cutter reaches the upper contour line of the work when the movement of the work is again reversed and the tracer and cutter frame again fed horizontally, and so on until the entire desired area of work has been gone over.

The machine of the patent is more particularly adapted to the production of intaglio or relief effects of comparatively small depth in or upon flat blocks. This results from the fact that the movement of the work and pattern support, and hence of the work and of the pattern themselves, is limited to a plane substantially perpendicular to the tracer and cutter. When necessary, therefore, to cut deeply into the work and especially when necessary to cut detail upon a concave or convex cylindrical surface the axis of the cutter will, except for those portions of the surface tangent to a plane parallel with the plane of movement of the work and pattern support, stand at an acute angle to the surface being worked upon so that the cutting edges of the cutter are unable to cut effectively.

It is the object of my invention to provide a machine of the character shown and described in the patent referred to, but so arranged that the work and pattern can be intermittently fed or rotated about an axis parallel to the plane of movement of the tracer and cutter frame and at right angles to the direction of movement of said frame during the operation of the machine, and at such a rate that the cutter, as it moves across the work will always be presented to the work on such angle that the cutting edges can work effectively.

I accomplish this desired result by providing the work and pattern support proper with an auxiliary carrier to which the work and pattern are respectively clamped and which is pivoted to the support so as to have movement about an axis parallel to the direction of movement of said support. This auxiliary carrier I connect by suitable gearing to the driving mechanism of the machine in such a way that the carrier is angularly rotated step by step about its axis in correspondence with the alternate up and down movements of the work and pattern as well as in correspondence with the transverse feed of the tracer and cutter.

Figure 2:
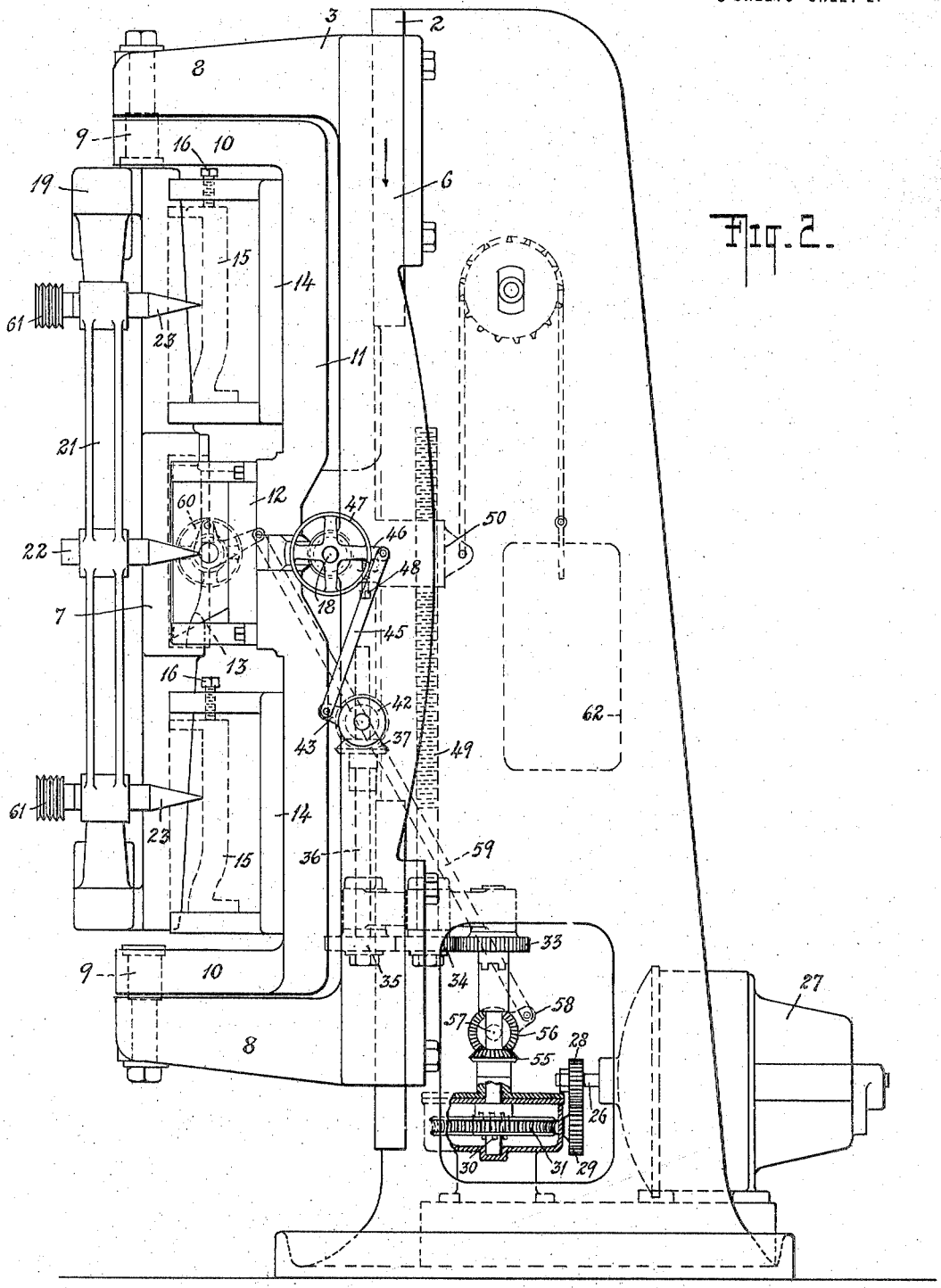

My invention will be better understood by referring to the accompanying drawings in which Figure 1 represents a front elevation of a preferred form of the assembled machine as arranged for the making of bottle molds; Fig. 2 represents an end elevation looking from the right of Fig. 1; Fig. 3 represents a plan view, part section, taken along the line 3—3 of Fig. 1, part of the machine being broken away; Fig. 4 represents a section, looking from the right, taken along the line 4—4 of Fig. 3, and Figs. 5, 6 and 7 are diagrammatic views illustrating the respective positions of the work and cutter at different stages of the operation of cutting a die blank with my improved machine.

In the drawings, the main frame, 1, which is preferably an integral casting, is provided at one end and preferably at top and bottom only, with a pair of parallel vertical guides, 2, for the work and pattern support proper, 3; and at the other end with a pair of parallel horizontal guides, 4, for the tracer and cutter frame bracket, 5.

Both the work and pattern support, 3, and the tracer and cutter frame bracket, 5, are respectively provided with ways, 6 and 7, which engage with the corresponding guides 2 and 3.

The work and pattern support is provided, at top and bottom, with forwardly projecting arms, 8, the extremities of which are bored in vertical alinement so as to have fixed therein journals 9 which constitute pivotal supports engaging the outer ends of arms 10 with which the auxiliary carrier 11 for work and pattern is provided.

The back of carrier 11 is provided with a surface which is cylindrically curved about the axis of journals 9.

The front of carrier 11 is provided with three flat supporting faces, one, 12, at the center for the pattern, 13, and the other two, 14, at top and bottom for the two work or die blanks, 15, which are to be worked upon by the cutters. Pattern and die blanks are held in position by clamps 16 in known manner.

A segmental curved rack 17 is fixed to the back of carrier 11 and engages with a feed worm 18 which is journaled in the work and pattern support 3.

Tracer and cutter frame bracket 5 has, at top and bottom, outwardly projected arms 19 bored to pivotally receive centers 20 fixed at one end of the swinging tracer and cutter frame 21; the other free end of frame 21 carries a central tracer 22 and upper and lower cutters 23. Tracer and cutters are all disposed perpendicularly to the plane of frame 21 and are equi-distant from its pivotal axis.

A lug 24 fixed to the back of bracket 5 engages with a horizontal feed screw 25 which is journaled in the main frame of the machine.

The motion of feed worm 18 is derived from shaft 26 of motor, 27, suitably bolted to main frame 1, which also constitutes the power source for the vertically reciprocable movement of the work and pattern support 3 and for the intermittently fed horizontally movable tracer and cutter frame bracket 5, as will be later described.

Shaft 26 carries a fixed gear 28 which meshes with a similar but slightly larger gear 29 which is fixed upon a worm 30 in engagement with a horizontally disposed worm gear 31 which drives a vertical stub shaft 32. Stub shaft 32 carries a fixed spur gear 33 which meshes with a gear 34 that is, itself, in mesh with a gear 35.

Gear 35 is fixed to a shaft 36 which carries a slidably keyed bevel gear 37; this shaft 36 is, as shown in the drawings, for convenience and compactness of design, located in a wide elongated slot 38 formed in the work and pattern support 3 and a suitably bored bar 39 across the slot serves for an upper bearing for shaft 36 and also supports gear 37 so that the latter will rise and fall upon the shaft in correspondence with the rise and fall of the work and pattern support.

Bevel gear 37 meshes with a similar gear 40 fixed upon a shaft 41 which is journaled in suitable bearings attached to the work and pattern support and carries, at its outer end, a ratchet actuator comprising a pair of fixed disks 42 and an intermediate loose disk 43. These disks are separated by felt disks 44 or the equivalent, and held together with moderate pressure. Disk 43 has a radially projecting lug to which is pivoted one end of a link 45 whose other end is pivoted to an arm 46 which is attached to a member 47 loosely mounted upon the outer end of feed worm 18 and provided with ratchet means whereby, when the arm 46 is moved in one direction, worm 18 is rotated, but when moved in the other direction worm 18 is unaffected. A stop screw 48 limits the movement of arm 46. Link 45 will, of course, be actuated by disk 43 by reason of the frictional engagement which said disk has with the fixed disks 42.

Owing to the much shorter length of the lever arm by means of which disk 43 actuates link 45, as compared with that of arm 46 through which link 45 acts upon worm 18, complete rotation of disk 43 will result before arm 46 has crossed the line joining the centers of shaft 41 and worm 18. In operation, therefore, if shaft 41 revolves in a given direction, arm 46 will merely move in the same direction through a certain angle and then return against stop 48 and remain there as long as shaft 41 continues its previous motion. And when shaft 41 reverses and rotates in the opposite direction because of the reversal of the motor 27 as is described more fully hereinafter, it is clear that exactly the same thing happens and that arm 46 again advances through the same angle as before and then returns against stop 48 where it remains until shaft 41 again reverses, and so on, indefinitely.

Gear 34 carries a feed screw 49 which has threaded engagement with a lug 50 fixed upon the back of work and pattern support 3; the latter will, therefore, be moved either up or down according as the feed screw is rotated in the one direction or the other.

A limit block 51 is fixed to support 3 and bored so as to loosely embrace a reversing rod 52, the lower end of which is pivotally attached to a pivotally mounted switch member 53 which controls the circuit of motor 27 so that the motor rotates in one direction when the switch is closed at one side and in a contrary direction when the switch is closed at the other side.

Reversing rod 52 carries a pair of stop rings 54, one on each side of lug 51, which may be individually fixed higher or lower, as desired, by means of the set screws provided for the purpose.

Stub shaft 32, besides spur gear 33, has fixed upon it a bevel gear 55 which meshes with a similar gear 56 fixed at one end of a shaft 57 suitably journaled upon the main frame of the machine. At the other end of shaft 57 is a ratchet actuator 58, identical with that described above as at the end of shaft 41, connected by a link 59 to a ratchet device 60 identical with that described above as at the end of work feed 18. Ratchet device 60 is at the end of and arranged to drive feed screw 25.

The cutters 23 are provided with pulleys 61 and adapted to be driven simultaneously by a belt (not shown) connected with a motor (not shown) mounted upon the tracer and cutter frame 21, as is well known in this art.

A weight 62 is so disposed within the hollow part of the main frame and so determined as to magnitude as to counterbalance the work and pattern support including its auxiliary carrier and the pattern and mold blocks carried thereby. Suitable means (not shown but well known in the art) are also employed to press the tracer and cutter frame inwardly thus keeping the cutter and tracer points pressed firmly against the work or die blanks and pattern respectively.

The operation of my improved machine is as follows:

The two die blanks 15 should be, preferably, first roughed out by manual control with some other and heavier machine as, e. g., by a milling machine. Or blanks cast roughly to shape may be used.

The pattern 13 and the two die blanks 15 being properly positioned and clamped down upon their supporting areas, 12 and 14 respectively, the circuits of motor 27 and of the motor driving the cutters 23 are closed. This will cause a downward movement of the work and pattern support 3, as shown by the arrows in the several figures, and a movement of the feed screw 49 counter-clockwise (looking from above). Feed worm 18 and feed screw 25 are unaffected so that carrier 11 will retain its fixed angular position with reference to support 3, and tracer and cutter frame 21 will also remain fixed in its transverse travel.

As the work and pattern support thus move downwardly, the tracer and cutter frame 21 will pivot about centers 20 so as to keep tracer point 22 against the pattern as the latter moves beneath the point of the tracer. The cutters 23 will simultaneously cut, in the die blanks, a path identical with that followed by the tracer.

When the support 3 has moved downwardly sufficiently far, limit block 51 will engage lower stop ring 54 and move reversing rod 52 downwardly, thus opening switch 53 at the lower contact and closing it again at the upper contact. This will reverse the motor 27 and the feed screw 49, thus moving the support 3 upwardly.

Simultaneously with the reversal of feed screw 49, shaft 36 will also reverse and, hence, shaft 41. This will rotate disk 42 through the angle predetermined by the stop 48 and will actuate link 45 so as to move the ratchet means connected with member 47; this will rotate feed worm 18 and hence rack 17 so as to swing carrier 11 about journals 9 in a counter-clockwise direction (looking from above) and through a predetermined angle which will correspond with the angle of rotation of disk 42.

Shaft 57 will also reverse with the reversal of feed screw 49, thus moving ratchet actuator 58 and, hence, ratchet 60 and feed screw 25, so as to move the tracer and cutter frame bracket 5 and the support 21 carried thereby one step to the right.

The rotational feed of carrier 11 and the transverse feed of support 21 is, of course, practically instantaneous.

The pattern and work are now carried upwardly under tracer and cutters respectively, until limit block 51 engages with upper lug 54 when the switch 53 is again reversed, thus again reversing feed screws, 49, 18 and 25. The work and pattern support is now again fed downwardly while carrier 11 and frame 21 are again shifted another step in rotation and traverse respectively in the same direction as before. And this sequence of operations will thus continue indefinitely until the entire surface of the pattern has been gone over by the tracer and until the die blanks have been completed in correspondence therewith.

Figs. 5, 6 and 7 show, in diagrammatic plan view, the respective positions of work and cutter at different stages of the operation of cutting a die blank with my improved machine as above described; Fig. 5 showing the position of cutter and blank at the beginning of the work; Fig. 6 showing the work when half completed (corresponding to its condition as shown in Figs. 1 to 4); and Fig. 7 showing the positions at the completion of the work. It will be seen from these figures that, by reason of the combined rotational movement of the work and traversing movement of the cutter, it is possible to engage the cutter with the work over its entire area and that, even at its extreme lateral edges, the cutter is not far from substantially normal with the tangential plane of the work at that point so that the cutting edges of the cutter have nearly their maximum effectiveness.

While I have shown my invention embodied in a preferred form, other forms and embodiments may, of course, be devised by those skilled in the art within the spirit of the invention and the scope of the following claims:

1. In a machine of the class described, a cutter carrier movable in a path normal to the cutter axis, a work carrier movable about an axis normal to the plane of movement of the cutter axis, the axis of said work carrier being positioned in front of the work, and means operatively connecting said carriers for giving them increments of movement in correspondence with one another.

2. In a machine of the class described, a cutter carrier movable in a path normal to the cutter axis, a work carrier movable about an axis normal to the plane of movement of the cutter axis and positioned in front of the work, means operatively connecting said carriers for giving them corresponding increments of motion, and means for relatively moving the work carrier and the cutter carrier in a path parallel to the axis of rotation of the work carrier.

3. In a machine of the class described, a cutter carrier and a work support movable in paths normal to one another and to the cutter axis, an auxiliary work carrier rotatably mounted upon said work support, the axis of said work carrier being positioned in front of the work, and means operatively connecting cutter carrier, work support and work carrier for giving said cutter carrier and said work carrier increments of movement in correspondence with one another and for moving the work support.

4. In a machine of the class described, a tracer and cutter frame adapted to hold a tracer and cutter in fixed relation to one another, a work and pattern support and an auxiliary carrier rotatably mounted upon the work and pattern support, the tracer and cutter frame and the work and pattern support being relatively movable in paths normal to one another and to the cutter and tracer axes and the axis of the auxiliary carrier being in front of the work and pattern support and parallel to said support's path of movement, and means operatively connecting said frame, said support and said auxiliary carrier for moving them in timed relation to one another.

In testimony whereof I have hereunto set my hand.

JOSEPH F. KELLER.